United States Patent
Xie

(10) Patent No.: US 8,032,540 B1
(45) Date of Patent: Oct. 4, 2011

(54) DESCRIPTION-BASED USER INTERFACE ENGINE FOR NETWORK MANAGEMENT APPLICATIONS

(75) Inventor: Lirong Xie, San Jose, CA (US)

(73) Assignee: Foundry Networks, Inc., San Jose, CA (US)

( * ) Notice: Subject to any disclaimer, the term of this patent is extended or adjusted under 35 U.S.C. 154(b) by 346 days.

(21) Appl. No.: 11/193,064

(22) Filed: Jul. 28, 2005

Related U.S. Application Data

(60) Provisional application No. 60/623,268, filed on Oct. 29, 2004.

(51) Int. Cl.
*G06F 17/30* (2006.01)

(52) U.S. Cl. ...................................... 707/756

(58) Field of Classification Search .................. None
See application file for complete search history.

(56) References Cited

U.S. PATENT DOCUMENTS

| | | | | |
|---|---|---|---|---|
| 6,223,190 | B1 * | 4/2001 | Aihara et al. | 715/234 |
| 6,560,633 | B1 | 5/2003 | Roberts et al. | 709/202 |
| 6,636,239 | B1 | 10/2003 | Arguie et al. | |
| 6,772,207 | B1 | 8/2004 | Dorn et al. | |
| 6,833,850 | B1 | 12/2004 | Arquie et al. | |
| 6,836,275 | B1 | 12/2004 | Arquie et al. | |
| 6,880,127 | B1 | 4/2005 | Arquie | |
| 6,952,208 | B1 | 10/2005 | Arquie et al. | |
| 6,961,938 | B1 | 11/2005 | Carwile et al. | |
| 7,069,291 | B2 | 6/2006 | Graves et al. | 709/201 |
| 7,197,545 | B1 | 3/2007 | Davie | |
| 7,219,300 | B2 | 5/2007 | Arquie et al. | |
| 7,310,774 | B1 | 12/2007 | Arquie et al. | |
| 7,590,648 | B2 | 9/2009 | Shankar et al. | |
| 2003/0200301 | A1 * | 10/2003 | Trzcinko et al. | 709/223 |
| 2004/0263900 | A1 * | 12/2004 | Nguyen et al. | 358/1.15 |

OTHER PUBLICATIONS

Paulus, Wolf, "Swing Rendering Engine," Swixmi © , 2003; first publication date unknown; downloaded ~ Jul. 2005.
Adwankar, Sandeep, "NetConf Data Model," Motorola, Inc., Jul. 19, 2004 at http://standards.nortel.com/netconf/docs/older_netmod/draft-adwanka, downloaded May 25, 2007.
Davis, M.C., Wipro Technologies, "Wipro XML-based Management Solution," © 2004; publication date unknown.
ArcanaNetworks:Products, "Our Products Extensible, Powerful, Reliable, About Our Products" at http://www.arcananet.com/Products, publication date unknown, downloaded May 25, 2007.
ArcanaNetworks:Technology, "Foundation: Built on Standards. Powerful. Adaptable. Scalable. Technology" at http://www.arcananet.com/Technology, publication date unknown, May 25, 2007.
Bojanic, Peter, "The Joy of XUL," at http://developer.mozilla.org/en/docs/The_Joy_of_XUL publication date unknown; downloaded May 25, 2007.

(Continued)

*Primary Examiner* — Don Wong
*Assistant Examiner* — Belinda Xue

(57) ABSTRACT

A user interface engine may be created that uses a descriptive language to describe the user interface fields, the corresponding device properties, and other layout attributes. This information may be stored in description file. The user interface engine may then read in this description file, render the user interface, and generate device property value payload. Then the payload may be deployed to target devices. This allows a network management application to be modified without requiring user interface code or data structure classes to be written or changed.

28 Claims, 15 Drawing Sheets

OTHER PUBLICATIONS

MDC, "XUL Tutorial:Introduction" at http://developer.mozilla.org/en/docs/XUL_Tutorial:XUL_Structure, publication date unknown; downloaded May 25, 2007.

Marek Lipovcan, "Language and User Interface for Router Configuration," 2006 (Master's Thesis on file with Masaryk University, Brno) publication date unknown.

* cited by examiner

DESCRIPTION-BASED USER INTERFACE ENGINE FOR NETWORK MANAGEMENT APPLICATIONS

CROSS-REFERENCE TO RELATED APPLICATION

This application claims priority based on U.S. Provisional Patent Application No. 60/623,268, entitled "GENERIC DESCRIPTION-BASED GRAPHICAL USER INTERFACE (GUI) ENGINE PLATFORM FOR NETWORK MANAGEMENT APPLICATIONS AND THEIR DEVELOPMENT", filed on Oct. 29, 2004, by Lirong Xie.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to the field of network management. More particularly, the present invention relates to a generic description-based graphical user interface engine platform for network management applications and their development.

BACKGROUND OF THE INVENTION

The management of computer networks has grown in complexity as networks have become larger and more advanced. New features offered by the networks require new features in the management software. As such, delivering a streamlined and effective network management product to businesses has become a goal of many software designers.

As network management applications have been developed for many years, there are a number of applications with complex code. This is due to the fact that typically programmers will add additional code when new features are added, but will not remove outdated or redundant code, either by choice or by simply not being able to locate all of the portions to be removed. This can all be traced to many companies' lack of a true development process and lack of adequate documentation regarding the created code.

This condition ultimately requires a steeper and longer learning curve for new developers to develop new features: as the code becomes more and more complex, it becomes harder and harder for developers to add additional features, and those additional features add more complexity to the code, making it even hard for developers to add newer features, and so on. This also puts a business at risk due to knowledge and design not being documented.

As such, programmers are often unable to meet shorted product cycles for new network management applications due to product requirement changes. For example, the label of a user interface may change, or new user interface fields in the application may need to be added. These changes are even more significant and complex if the Simple Network Management Protocol (SNMP) management information base (MIB) definitions are changed, which results in more work for modifications, backward compatibility issues, etc. Furthermore, once all this is changed, a Quality Assurance (QA) and documentation team must also reperform all testing and update the user manuals, all of which ultimately delays product delivery.

Furthermore, past solutions have been plagued by an inefficient network management software development process. Whenever a new product feature is required, a new graphical user interface (GUI) or Java applet may be developed, although the underlying workflow has not changed (getting user settings from the GUI, binding them to the SNMP MIB variables, and deploying the settings to the target devices). This leads to laborious programming, error-prone and repetitive work, code duplication, etc. The more code that is written, the more that bugs will be encountered. This includes time consuming software debugging and maintenance, as well as support costs. The past development process fails to identify the commonalities underlying network management software applications.

What is needed is a way to be able to massively produce network management software applications without laborious programming.

Furthermore, what is needed is a solution that allows network administrators to customize network management applications to meet their own needs. There currently is no widely-known way for a network administrator to change the network management application's user interface to allow him to add/delete/update the user interface to the network administrator's own liking, or to manage new devices that are not native to the network management application. If a customer has a new request, they must ask the application vendor to develop a customized solution just for the one customer, which may not be needed by other customers. This adds costs to the network management application that other customers must bear.

BRIEF DESCRIPTION

A user interface engine may be created that uses a descriptive language to describe the user interface fields, the corresponding device properties, and other layout attributes. This information may be stored in description file. The user interface engine may then read in this description file, render the user interface, and generate device property value payload. Then the payload may be deployed to target devices. This allows a network management application to be modified without requiring user interface code or data structure classes to be written or changed.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
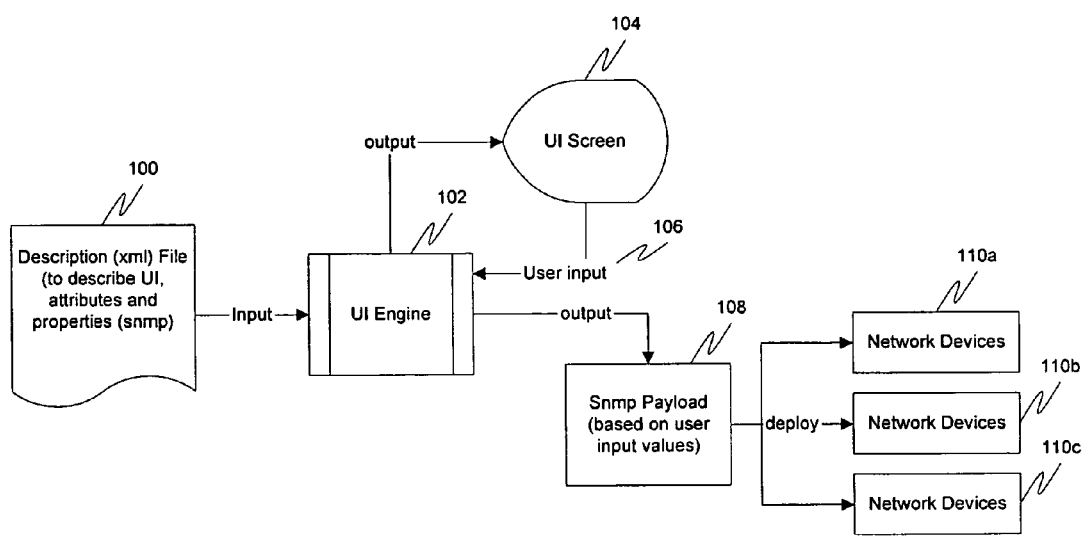
FIG. 1 is a block diagram illustrating a user interface engine in accordance with an embodiment of the present invention.

Rather than constantly altering code in a network management application, a user interface engine may be created that uses a descriptive language to describe the user interface fields, the corresponding device properties, and other layout attributes. This information may be stored in description file. The user interface engine may then read in this description file, render the user interface, and generate device property value payload. Then the payload may be deployed to target devices. During this process, no user interface code or data structure classes are required to be written or changed.

The completed user interface engine may then allow a user to add or import a text file and populate the user interface. It may further allow "hot-deployment", where as soon as the text file is dropped into the user interface engine directory, the user interface engine may automatically populate the user interface based on the description.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In an embodiment of the present invention, the descriptive language used is Extensible Markup Language (XML), however one of ordinary skill in the art will recognize that other descriptive languages may be used. Additionally, the device properties may be stored in an SNMP MIB, and thus the device property value payload may be SNMP MIB values. One of ordinary skill in the art will recognize that other data structures may be used in lieu of an SNMP MIB.

By utilizing the descriptive language, if the product requirements change, such as MIB changes, user interface label changes, etc., the changes may be easily applied by simply modifying the description file, without the need to change the code, or even restart the engine. Furthermore, new features may be produced by simply creating new description files that describe the new features, without any further software development (i.e., coding) effort. Users are also able to customize the network management application and choose what to manage, as well as what to see on the user interface, without changing the source code.

The present invention also allows a new business paradigm in the delivery of network management software. It provides a company with many choices as to how to best utilize the network management software. For example, the company could choose to utilize the user interface engine solely in-house, creating user interfaces for network management and then distributing only those completed (and uneditable) user interfaces to customers. Alternatively, the company could choose to distribute the user interface engine to customers along with a library of description files. The customers could then elect to utilize one or more of the description files, or to create their own description files. In another alternative, the company could simply distribute the user interface engine to customers and expect the customers to create their own description files.

In an embodiment of the present invention, a user may log in to a web browser to manage the device. The web browser may run the user interface engine in its window.

FIG. 1 is a block diagram illustrating a user interface engine in accordance with an embodiment of the present invention. A description file 100 such as an XML file may be passed as input to the user interface engine 102. The description file 100 may include user interface variables, as well as SNMP attributes and properties. A user interface screen 104 may display the output of the user interface engine 102. In response to this, the user may input information 106 which may be transmitted to the user interface engine 102. The user interface engine 102 may then utilize this information to output an SNMP Payload 108. This payload 106 may then be deployed to network devices 110a, 110b, 110c. A network device may be any device coupled to a network including, for example, switches, routers, wireless access points, etc.

Figure 2:
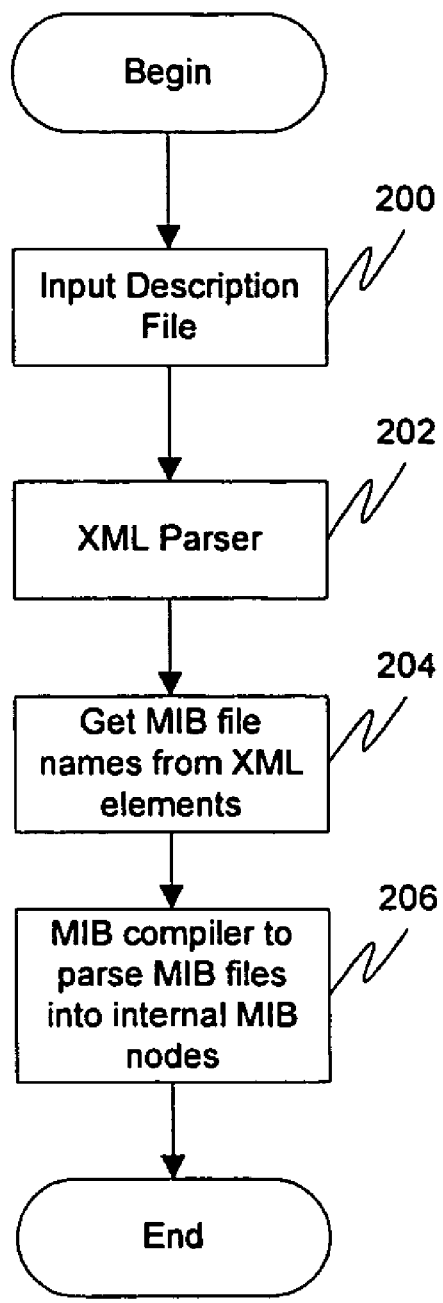
FIG. 2 is a flow diagram illustrating a method for initializing a user interface engine in accordance with an embodiment of the present invention.

FIG. 2 is a flow diagram illustrating a method for initializing a user interface engine in accordance with an embodiment of the present invention. At 200, a description file may be input. This either may be explicitly input into the engine, or the engine may be programmed to look in a particular place (such as a specific directory) for the file. This file may then be parsed by an XML parser at 202. At 204, MIB file names may be retrieved from XML elements in the parsed file. At 206, an MIB compiler may be used to parse MIB files into internal MIB nodes. Through this, if an underlying MIB changes, the user interface will automatically reflect the changes. For example, a user interface may display choices in a drop-down list, the choices being defined in an MIB. If the corresponding MIB then changes, then the user interface will automatically change the choices available in the drop-down list in accordance with the changes.

Figure 3:
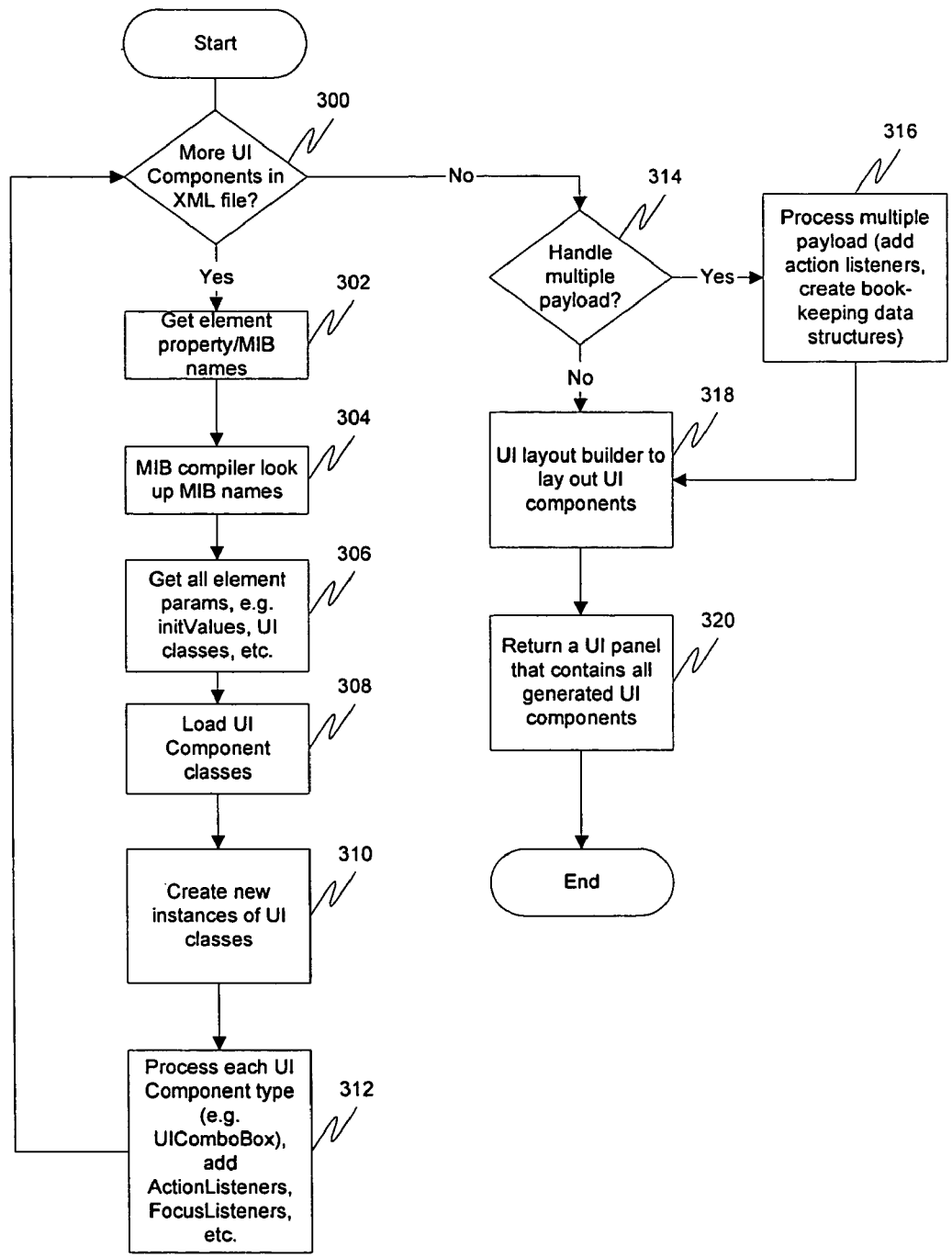
FIG. 3 is a flow diagram illustrating a method for generating user interface components based on an XML description file in accordance with an embodiment of the present invention.

FIG. 3 is a flow diagram illustrating a method for generating user interface components based on an XML description file in accordance with an embodiment of the present invention. At 300, it may be determined if there are any more user interface components in the XML file. If so, then at 302 an element property/MIB names may be retrieved from the XML file. At 304, the MIB compiler may look up the MIB names. At 306, all element parameters (for example, initValues, user interface classes, etc.) may be retrieved from the XML file. At 308, the user interface component classes may be loaded. At 310, new instances of user interface classes may be created. At 312, each user interface component type (e.g., UIComboBox) may be processed.

If there are no more user interface components in the XML file, then at 314, it may be determined if the system can handle multiple payloads. If so, then at 316 multiple payloads may be processed (e.g., add action listeners, create book-keeping data structures). At 318, the user interface layout builder may be utilized to lay out user interface components. At 320, a user interface panel that contains all generated user interface components may be returned.

Figure 4:
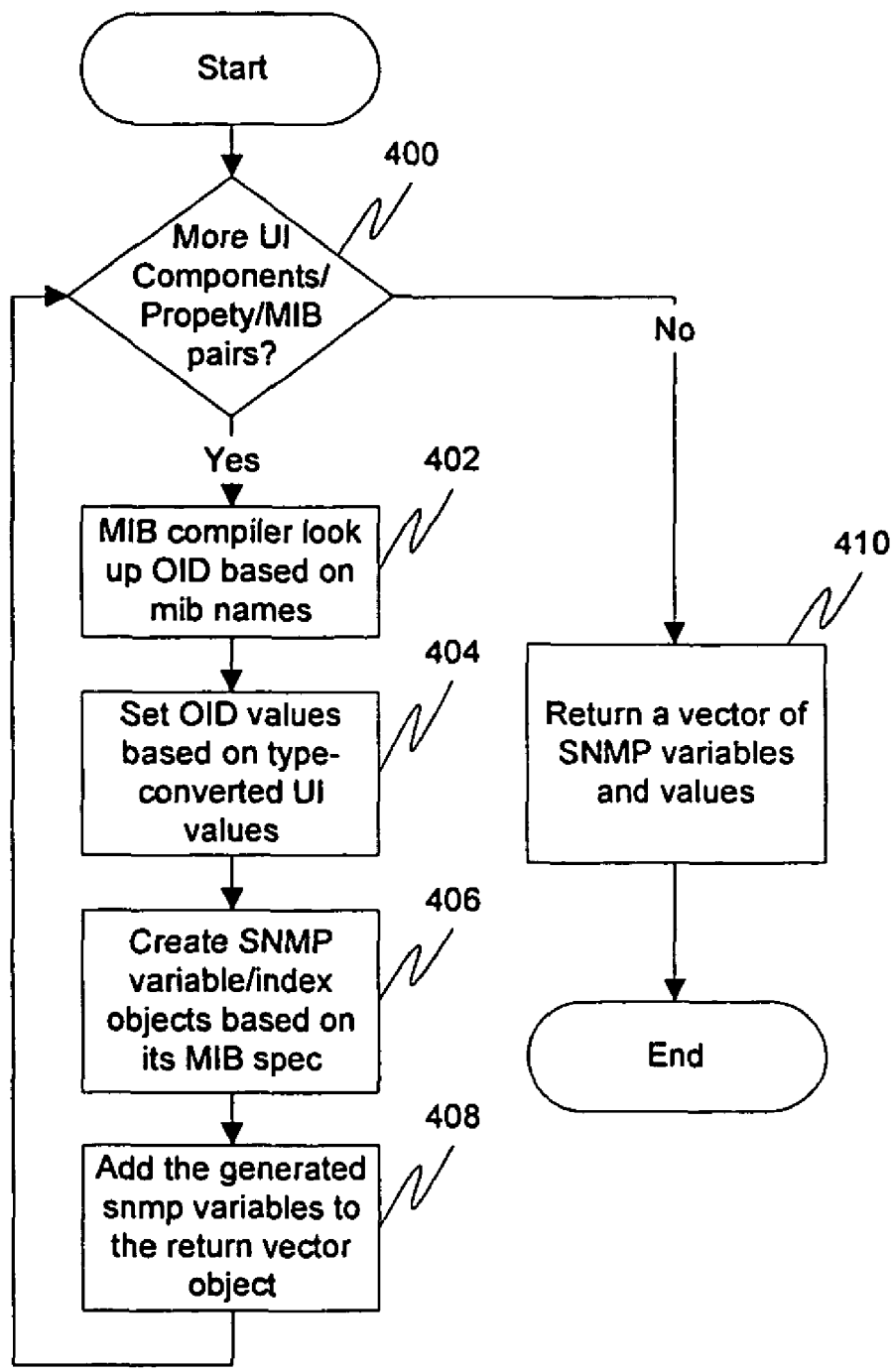
FIG. 4 is a flow diagram illustrating a method for generating an SNMP payload based on user interface values in accordance with an embodiment of the present invention.

FIG. 4 is a flow diagram illustrating a method for generating an SNMP payload based on user interface values in accordance with an embodiment of the present invention. At 400, it may be determined if there are any more component/MIB or property/MIB pairs. If so, then at 402 an MIB compiler may look up an object ID based on MIB names. Then at 404, object ID values may be set based on type-converted user interface values. At 406, SNMP variable/index objects may be created based on its MIB specification. Then, at 408, the generated SNMP variables may be added to the return vector object. This loop may be repeated for each UI component/MIB or property MIB pair. Once all of them have been handled, then at 410, a vector of SNMP variables and values may be returned.

Figure 5:
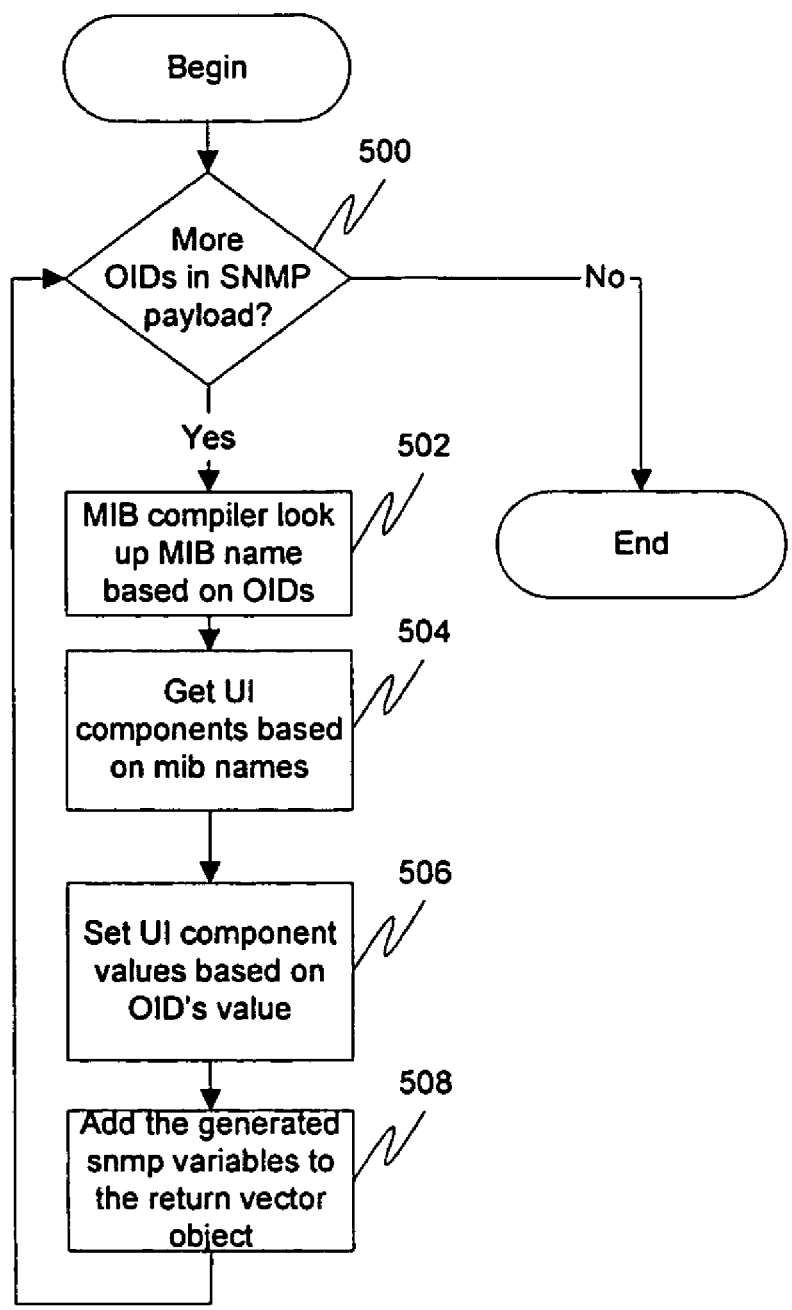
FIG. 5 is a flow diagram illustrating a method for setting user interface values based on an SNMP payload in accordance with an embodiment of the present invention.

FIG. 5 is a flow diagram illustrating a method for setting user interface values based on an SNMP payload in accordance with an embodiment of the present invention. In this embodiment, a network device has sent back an MIB, and thus the UI engine is responding to it rather than to a description file directly. At 500, it may be determined if there are more object IDs in the SNMP payload. If not, the process ends. If so, however, then at 502 the MIB compiler may look up the MIB name based on the object IDs. At 504, the user interface components may be retrieved based on the MIB names. At 506, the user interface component values may be set based on the object ID values. Then, at 508, the generated SNMP variables may be added to the return vector object.

Figure 6:
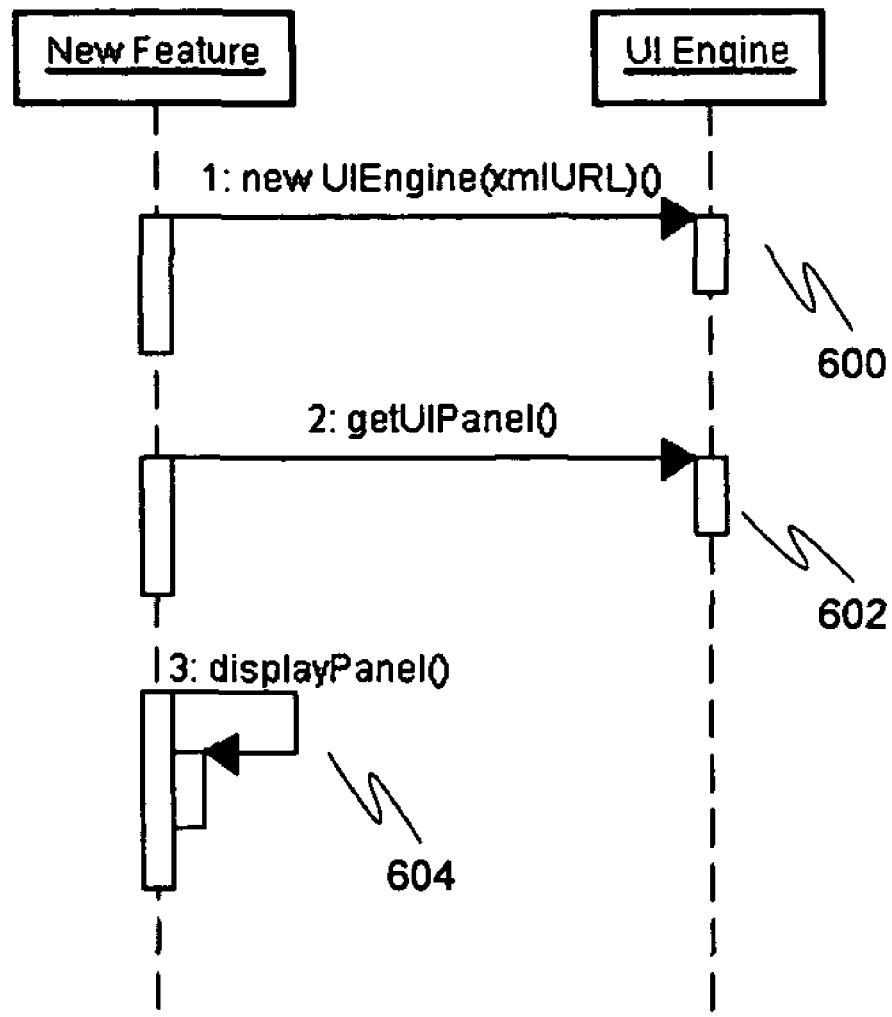
FIG. 6 is a use-case diagram illustrating creating user interface components and layout in accordance with an embodiment of the present invention.

FIG. 6 is a use-case diagram illustrating creating user interface components and layout in accordance with an embodiment of the present invention. At 600, new UIEngine(xmlURL) may be called. This may begin the UI engine. Then, at 602, getUIPanel may be called, which may generate a UI panel based on a description file, and return the panel. Then, at 604, displayPanel may be called, which may display the panel on the computer screen.

Figure 7:
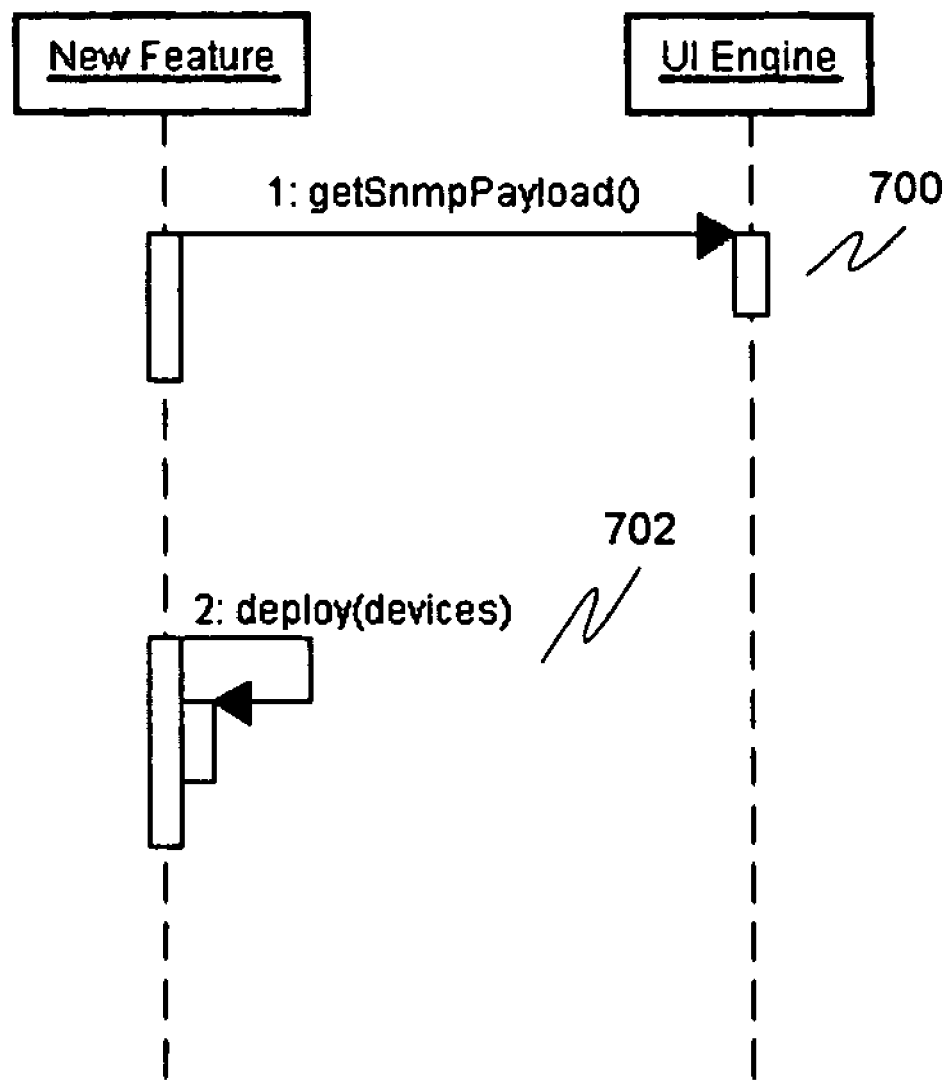
FIG. 7 is a use-case diagram illustrating creating and deploying an SNMP payload based on UI values in accordance with an embodiment of the present invention.

FIG. 7 is a use-case diagram illustrating creating and deploying an SNMP payload based on UI values in accordance with an embodiment of the present invention. At 700, getSNMPPayload may be called, which may generate the payload based on the values input to the user interface. Then, at 702, deploy(devices) may be called to deploy the payload to the various network devices in the network.

Figure 8:
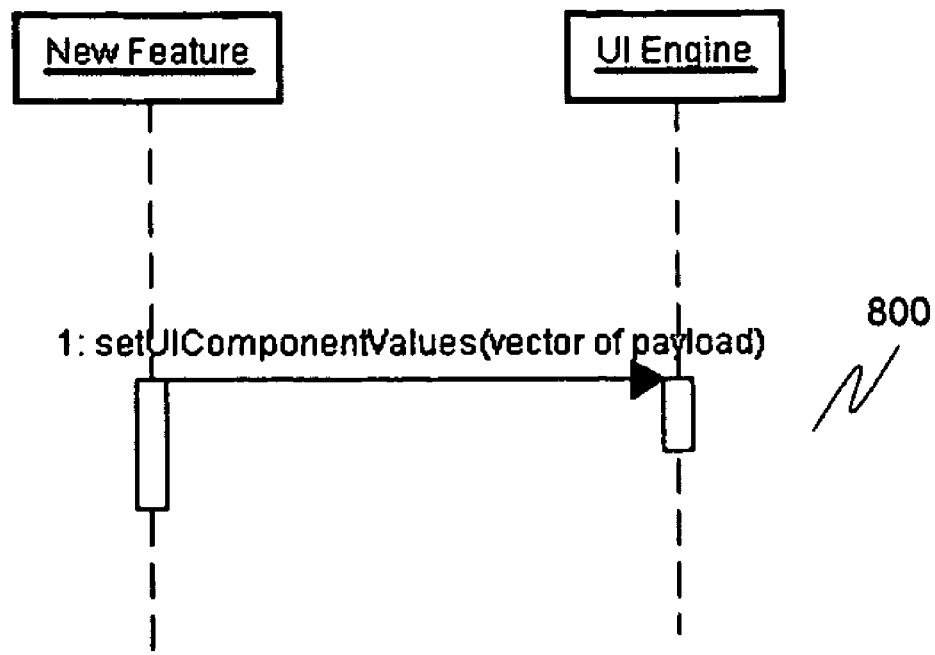
FIG. 8 is a use-case diagram illustrating displaying an SNMP Payload on a user interface in accordance with an embodiment of the present invention.

FIG. 8 is a use-case diagram illustrating displaying an SNMP Payload on a user interface in accordance with an embodiment of the present invention. At 800, setUIComponentValues(vector of payload) may be called, which receives a vector of payloads from a network device and then displays the payloads in a user interface.

Examples will be provided herein to illustrate the user interface engine of an embodiment of the present invention. One of ordinary skill in the art will recognize that these are merely examples and are not meant to be limiting.

Figure 9:
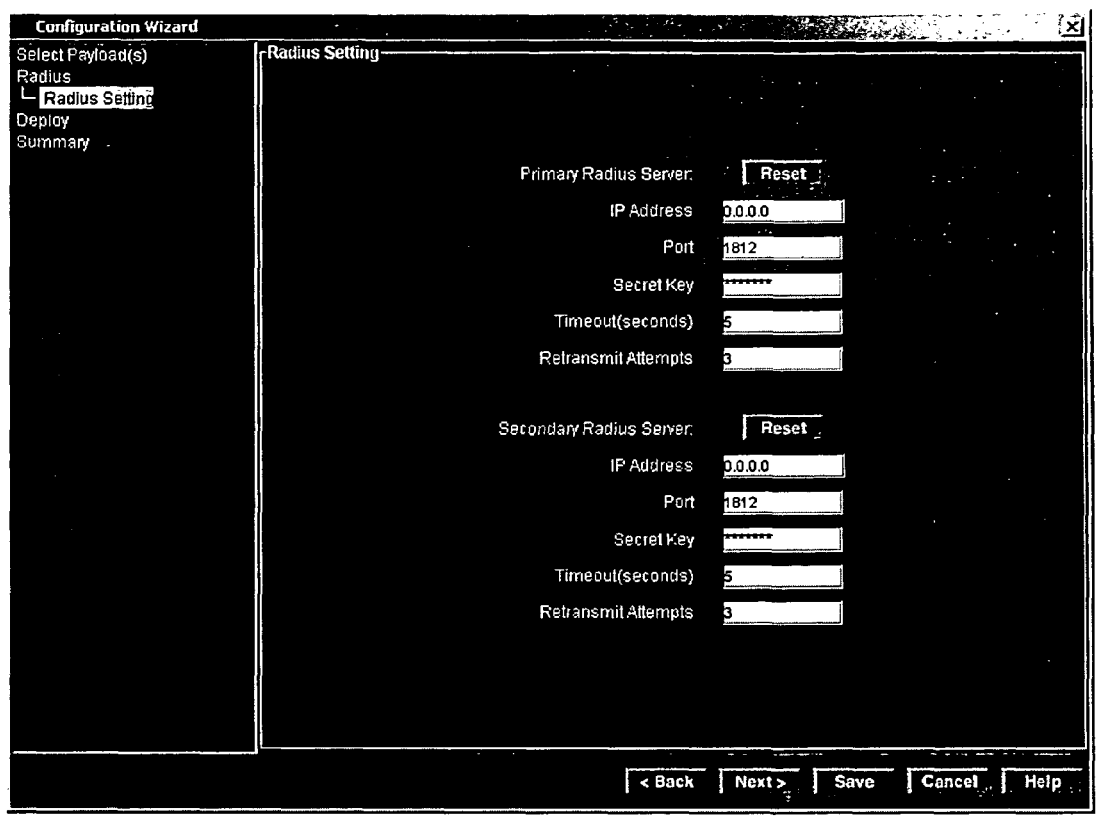
FIG. 9 is a screen capture illustrating a user interface for setting a radius server as was performed in the past.

In a first example, a Remote Authentication Dial-In User Service (RADIUS) server may be set. A RADIUS server provides authentication for users of a network. Variables like IP address and port must be set on the RADIUS Server. FIG. 9 is a screen capture illustrating a user interface for setting a RADIUS server as was performed in the past. Notice the lack of a RADIUS Server Accounting Setting section, which, without the benefit of the present invention, had to be left out because of time-restraints and its user interface components would have to be individually coded.

Using the present invention, the following XML description file may be used as the description file:

```
<?xml version="1.0"?>
<!--
the default sementics of "property" is snmp mib variable name. Future versions will allow plug-in's that can interpret "property"
as CLI command's input parameters, etc, with pluggable transport layer
    (ssh, telnet, snmp, etc).
-->
<PAGE name="Radius">
<GLOBALSETTINGS>
    <UIAlignment value="vertical"/><!-- vertical or horizontal-->
<defaultUIClass
class="com.foundrynet.client.UI.UITextField"/>
<mibfile name="RFC1155-SMI.txt, RFC1213-MIB.txt, foundry_ap.mib"/>
</GLOBALSETTINGS>
<GROUP name="Radius Server Accounting">
<GENERATE>
<UIComponent        label="Radius        Server:"
class="com.foundrynet.client.UI.UIComboBox"
value="Primary[1],Secondary[2]"
initValue="Primary[1]"  state="enabled"  payload="all"
property="dot11AuthenticationServerIndex"/>
```

```
<UIComponent label="Accounting Server Port:"
class="com.foundrynet.client.util.MinBoundedNumeric
TextField" value="1024"
property="dot11AuthenticationAcctPort"/>
<UIComponent label="Accounting Server Timeout(sec-
onds):"
class="com.foundrynet.client.util.MinBoundedNumeric
TextField" value="60"
property="dot11AuthenticationInterirnUpdate"/>
</GENERATE>
  <GROUPSETTINGS>
  </GROUPSETTINGS>
</GROUP>
</PAGE>
```

Figure 10:
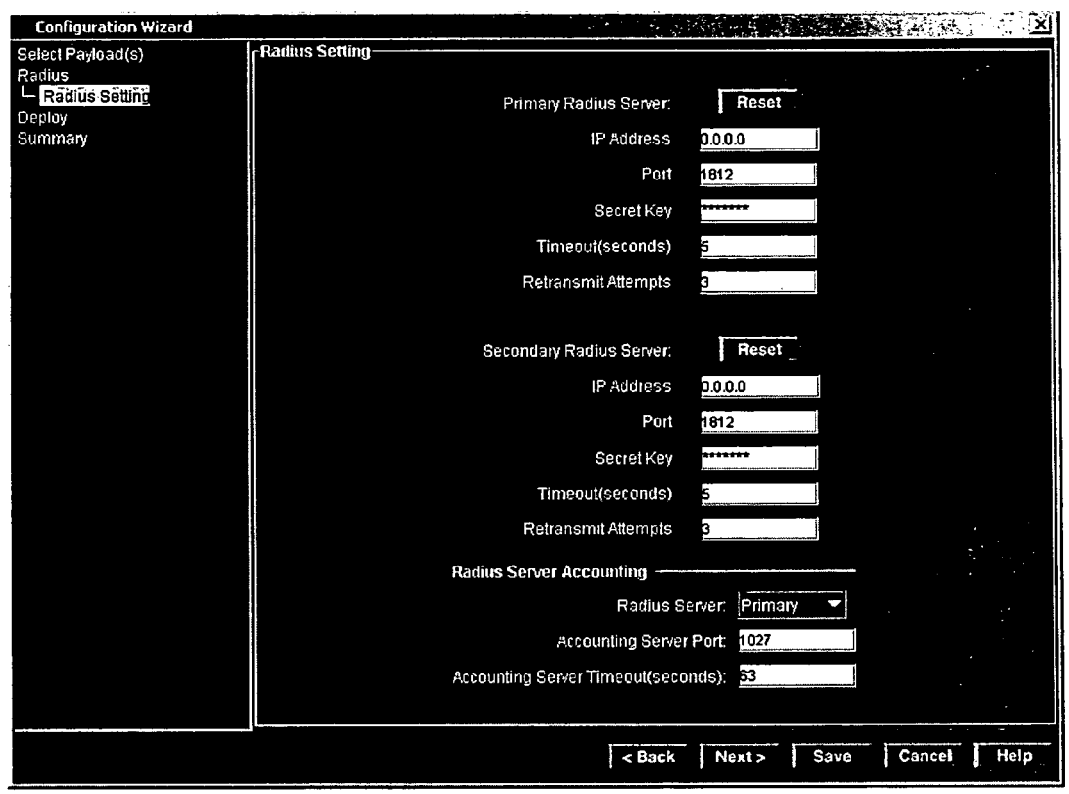
FIG. 10 is a screen capture illustrating a user interface for setting a radius server in accordance with an embodiment of the present invention.
Figure 11:
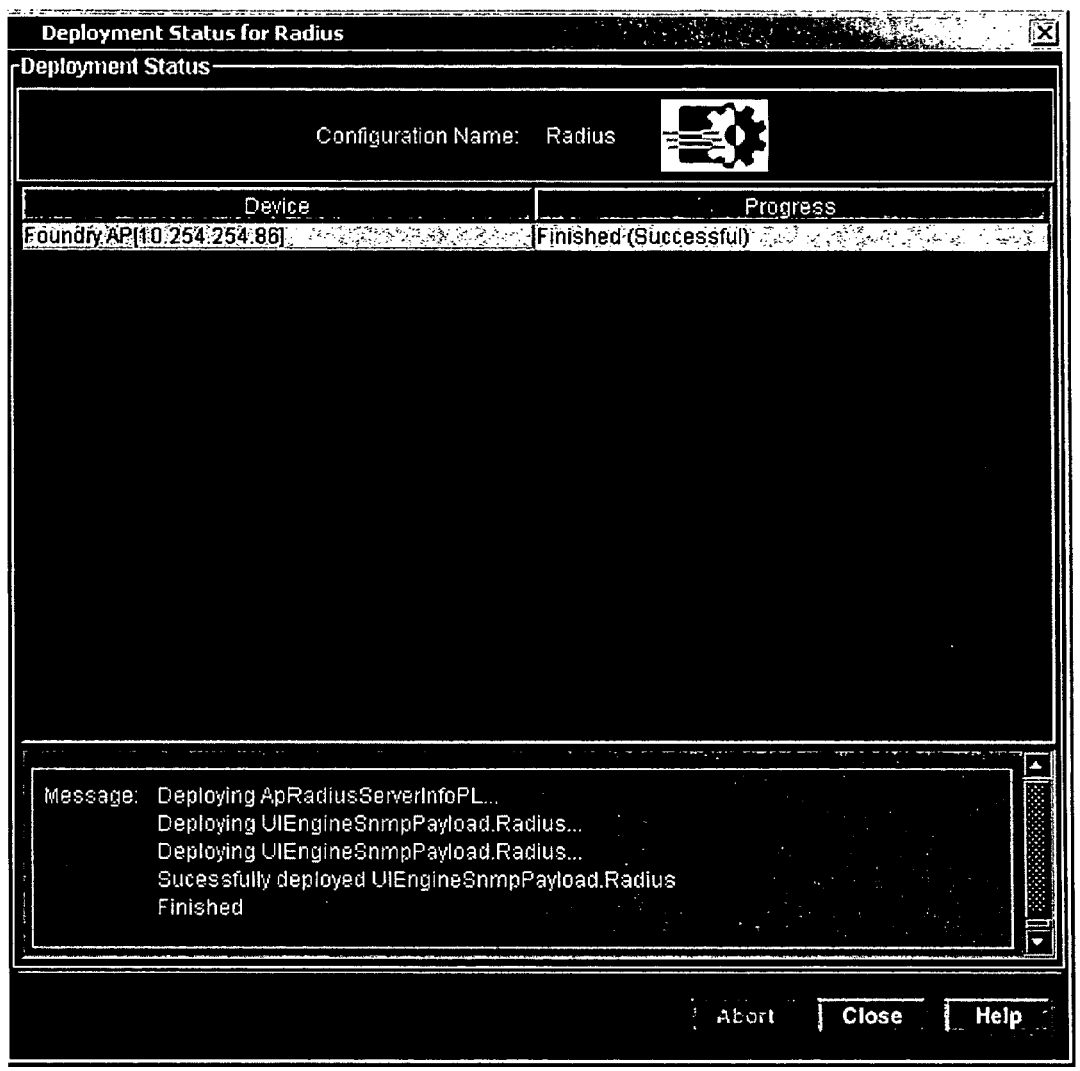
FIG. 11 is a screen capture illustrating successful deployment for a radius server in accordance with an embodiment of the present invention.

FIG. 10 is a screen capture illustrating a user interface for setting a radius server in accordance with an embodiment of the present invention. Here, the user interface engine utilizes the XML description file above to generate the depicted screen capture. Notice the inclusion of the Radius Server Accounting section. The user has then entered various values in the user interface fields. Once the save button is clicked, the user interface engine may process the values into an SNMP payload for deployment to the network device(s), see e.g., network devices 110a-c of FIG. 1. FIG. 11 is a screen capture illustrating successful deployment of various settings for a RADIUS server in accordance with an embodiment of the present invention.

In another example, setting a country code on a network device, such as a wireless access point, may be described. The following XML description file may be used as the description file.

```
<?xml version="1.0"?>
<!-- the default semantics of "property" is snmp mib variable name
<PAGE name="Country Code Settings">
<GLOBALSETTINGS>
  <UIAlignment value="vertical"/><!-- vertical or horizon-
tal-->
  <defaultUIClass
class="com.foundrynet.client.UI.UITextField"/>
  <mibfile name="RFC1155-SMI.txt, RFC1213-MIB.txt,
foundry_ap.mib"/>
</GLOBALSETTINGS>
<GROUP name="Country Code Settings">
<GENERATE>
  <UIComponent label="Country Code:"
class="com.foundrynet.client.UI.UIComboBox"
value="AL-ALBANIA, DZ-ALGERIA, AR-ARGENTINA,
AM-ARMENIA, AU-AUSTRALIA, AT-AUSTRIA,
AZ-AZERBAIJAN, BH-BAHRAIN, BY-BELARUS,
BE-BELGIUM, BZ-BELIZE, BO-BOLVIA, BR-BRAZIL,
BN-BRUNEI_DARUSSALAM, BG-BULGARIA,
CA-CANADA, CL-CHILE, CN-CHINA, CO-COLOMBIA,
CR-COSTA_RICA, HR-CROATIA, CY-CYPRUS,
CZ-CZECH-REPUBLIC, DK-DENMARK, DO-DOMINI-
CAN-REPUBLIC, EC-ECUADOR, EG-EGYPT, EE-ES-
TONIA, FI-FINLAND, FR-FRANCE, GE-GEORGIA, DE-
GERMANY, GR-GREECE, GT-GUATEMALA,
HK-HONG-KONG, HU-HUNGARY, IS-ICELAND,
IN-INDIA, ID-INDONESIA, IR-IRAN, IE-IRELAND, IL-
ISRAEL, IT-ITALY, JP-JAPAN, JO-JORDAN, KZ-KAZA-
KHSTAN, KP-NORTH KOREA, KR-KOREA_REPUB-
LIC, KW-KUWAIT, LV-LATVIA, LB-LEBANON,
LI-LIECHTENSTEIN, LT-LITHUANIA, LU-LUXEM-
BOURG, MO-MACAU, MK-MACEDONIA, MY-MALAY-
SIA, MX-MEXICO, MC-MONACO, MA-MOROCCO, NL-
NETHERLANDS, NZ-NEW ZEALAND, NO-NORWAY,
OM-OMAN, PK-PAKISTAN, PA-PANAMA, PE-PERU,
PH-PHILIPPINES, PL-POLAND, PT-PORTUGAL,
PR-PUERTO_RICO, QA-QATAR, RO-ROMANIA,
RU-RUSSIA, SA-SAUDI_ARABIA, SG-SINGAPORE,
SK-SLOVAK-REPUBLIC, SI-SLOVENIA, ZA-SOUTH
AFRICA, ES-SPAIN, SE-SWEDEN, CH-SWITZERLAND,
SY-SYRIA, TW-TAIWAN, TH-THAILAND, TR-TURKEY,
UA-UKRAINE, AE-UNITED_ARAB_EMIRATES,
GB-UNITED_KINGDOM, US-UNITED_STATES,
UY-URUGUAY, VE-VENEZUELA, VN-VIETNAM"
initValue="US-UNITED_STATES"
property="swCountryCode">
</GENERATE>
  <GROUPSETTINGS>
  </GROUPSETTINGS>
</GROUP>
</PAGE>
```

Figure 12:
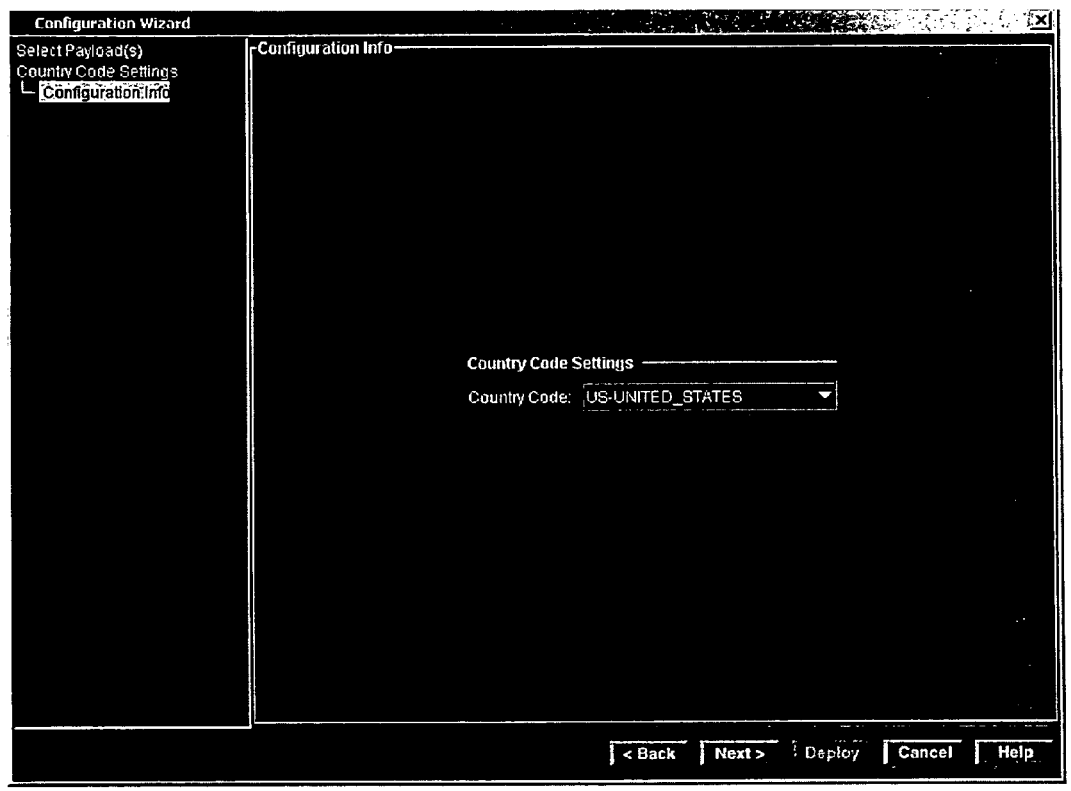
FIG. 12 is a screen capture illustrating a user interface for setting a country code in accordance with an embodiment of the present invention.

FIG. 12 is a screen capture illustrating a user interface for setting a country code in accordance with an embodiment of the present invention. Here, the user interface engine utilizes the XML description file above to generate the depicted screen capture, which includes a field for setting a country code.

In another example, the setting of antenna parameters on a wireless access point may be described. The following XML description file may be used as the description file.

```
<?xml version="1.0"?>
<!--
1. the default sementics of "property" is snmp mib variable name
2. if value is not defined, UIEngine will assume the mib variable has enums defined. It will try to read the enums.
-->
<PAGE name="Radio Settings">
<GLOBALSETTINGS>
  <UIAlignment value="vertical"/><!-- vertical or horizon-
tal-->
  <defaultUIClass
class="com.foundrynet.client.UI.UIComboBox"/>
  <mibfile name="RFC1155-SMI.txt, RFC1213-MIB.txt,
foundry_ap.mib"/>
</GLOBALSETTINGS>
<GROUP name="Antenna Settings">
  <GENERATE>
<!-- the format RadioA[3] indicates that the uistring is
"RadioA", and its snmp ifIndexValue is 3 -->
<I- In Radio settings, symbolic names("RadioA" and
"RadioG") are hardcoded/used in the radiosettings code. If
index value changes in the future, no need to change the
program, simply changes; the index values (3 or 7) here
instead.-->
  <UIComponent label="Radio Type:" value="RadioA[3],
RadioG[7]" initValue="RadioA[3]" state="disabled"
property="enterpriseApRadioIndex"/>
  <UIComponent label="Antenna Type:"
property="enterpriseApRadioAntennaType"/>
  <UIComponent label="Antenna Diversity:"
property="enterpriseApRadioAntennaDiversity"/>
  <UIComponent label="Antenna Location:"
property="enterpriseApRadioAntennaLocation"7>
</GENERATE>
  <GROUPSETTINGS>
  </GROUPSETTINGS>
</GROUP>
</PAGE>
```

Figure 13:
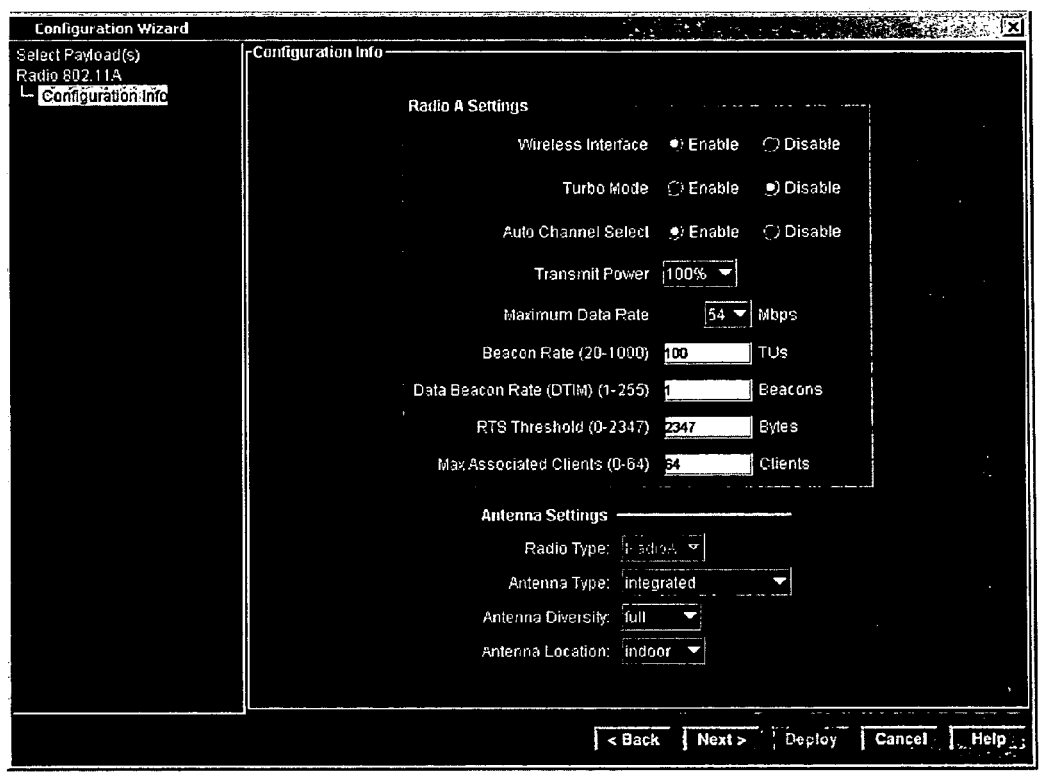
FIG. 13 is a screen capture illustrating a user interface for setting antenna information in accordance with an embodiment of the present invention.

FIG. 13 is a screen capture illustrating a user interface for setting antenna information on a wireless access point in accordance with an embodiment of the present invention. Here, the user interface engine utilizes the XML description file above to generate the depicted screen capture.

It should be noted that any type of network device management may be performed utilizing the present invention. This may include, for example, setting configuration settings on network devices, diagnosing problems with network devices, and retrieving information off network devices. The network devices may include any network device, for example, switches, routers, wireless access points, etc.

Figure 14:
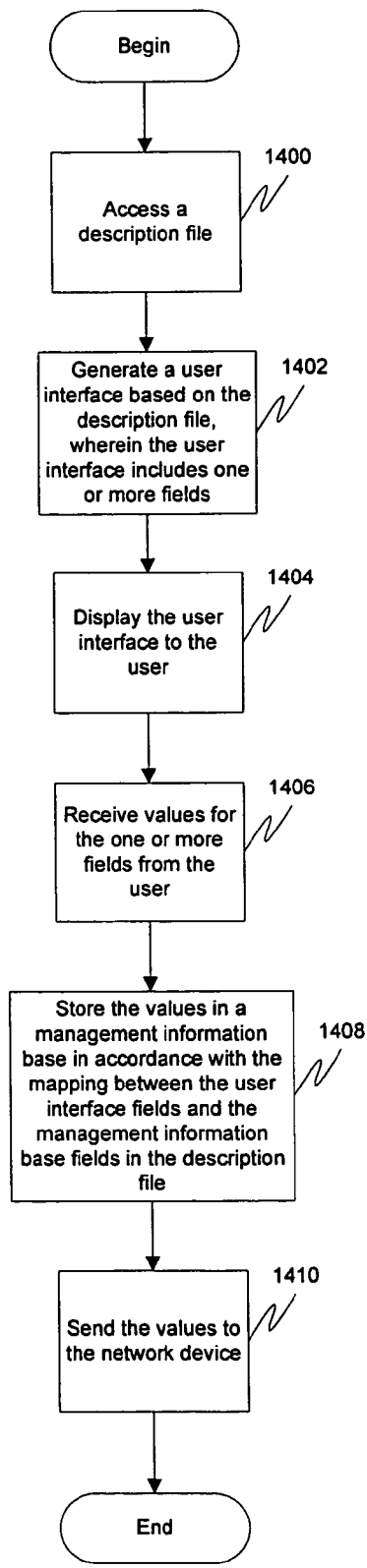
FIG. 14 is a flow diagram illustrating a method for managing a network device in accordance with an embodiment of the present invention.

FIG. 14 is a flow diagram illustrating a method for managing a network device in accordance with an embodiment of the present invention. Each act of the method may be performed in hardware, software, or any combination thereof. At 1400, a description file may be accessed. This may be accessed after receiving a location for the file, or the engine may be programmed to look in a particular location for the file. The description file may include information, written in a descriptive language such as XML, on how to display a user interface. It may further include a mapping between user interface fields and management information base fields. At 1402, a user interface may be generated based on the description file, wherein the user interface includes one or more fields. At 1404, the user interface may be displayed to the user. At 1406, values for the one or more fields may be received from the user. At 1408, the values may be stored in a management information base in accordance with the mapping between the user interface fields and the management information base fields. At 1410, the values may be sent to the network device. This may include sending the management information base to the network device.

Figure 15:
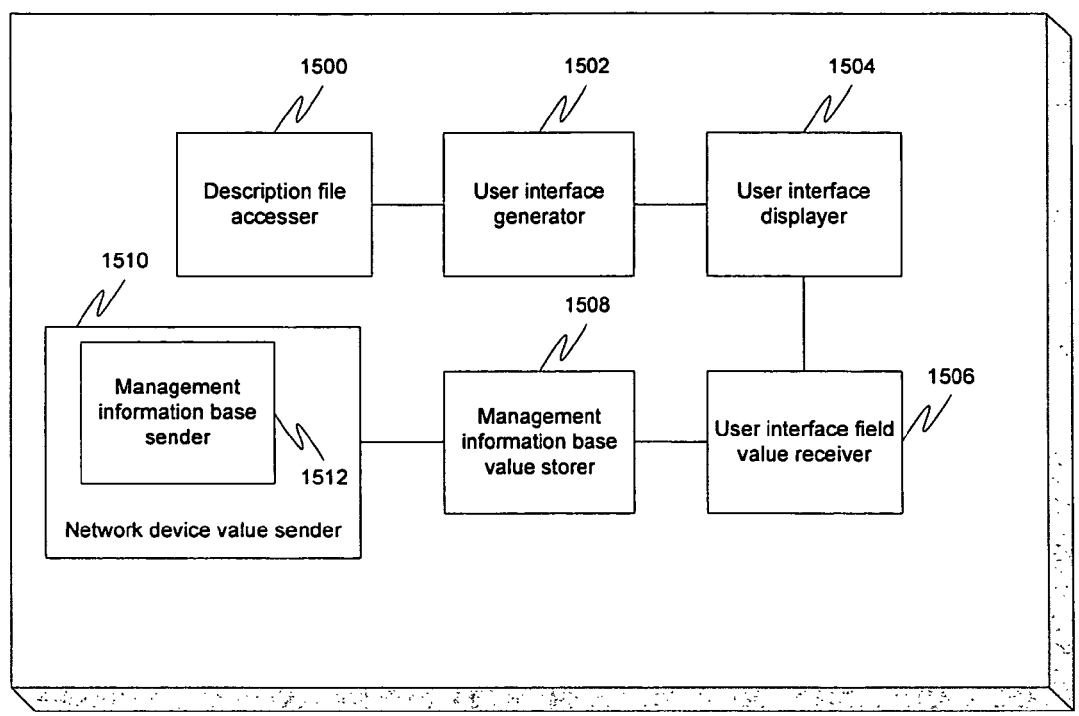
FIG. 15 is a block diagram illustrating an apparatus for managing a network device in accordance with an embodiment of the present invention.

FIG. 15 is a block diagram illustrating an apparatus for managing a network device in accordance with an embodiment of the present invention. Each element of the apparatus may be embodied in hardware, software, or any combination thereof. A description file accesser 1500 may accesse a description file. This may be accessed after receiving a location for the file, or the engine may be programmed to look in a particular location for the file. The description file may include information, written in a descriptive language such as XML, on how to display a user interface. It may further include a mapping between user interface fields and management information base fields. A user interface generator 1502 coupled to the description file accesser 1500 may generate a user interface based on the description file, wherein the user interface includes one or more fields. A user interface displayer 1504 coupled to the user interface generator 1502 may display the user interface to the user. A user interface field value receiver 1506 coupled to the user interface displayer 1504 may receive values for the one or more fields from the user. A management information base value storer 1508 coupled to the user interface field value receiver 1506 may store the values in a management information base in accordance with the mapping between the user interface fields and the management information base fields. A network device value sender 1510 coupled to the management information base value storer 1508 may send the values to the network device. This may include sending the management information base to the network device using a management information base sender 1512.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method comprising:

accessing a description file stored in a memory that includes information corresponding to one or more user interface fields wherein the description file includes information written in a markup language, on how to display a user interface;

generating a user interface based on the description file, wherein the user interface includes the one or more user interface fields that are mapped to a management information base (MIB) name in the description file that is mapped to an object identifier for identifying a value corresponding to a user interface field, wherein the description file includes a mapping between the user interface fields and management information base fields;

receiving values for the one or more user interface fields wherein a modification of the user interface is effected to include the one or more user interface fields in addition to interface fields that existed in the interface prior to the inclusion of the one or more interface fields independently of a change in source code; and storing the values in a management information base in accordance with the mapping between the user interface fields and the management information base fields.

2. The method of claim 1, wherein the descriptive language is Extensible Markup Language (XML).

3. The method of claim 1, wherein the method further includes sending the management information base to a network device to be managed based on the values in the management information base.

4. An apparatus comprising:

a description file accesser configured to access a description file stored in a memory that includes information corresponding to one or more user interface fields wherein the description file includes information, written in a markup language, on how to display a user interface;

a user interface generator coupled to the description file accesser and configured to generate a user interface based on the description file, wherein the user interface includes the one or more user interface fields that are mapped to a management information base (MIB) name in the description file that is mapped to an object identifier for identifying a value corresponding to a user interface field, wherein the description file includes a mapping between the user interface fields and management information base fields;

a user interface field value receiver configured to receive values for the one or more user interface fields wherein a modification of the user interface is effected to include the one or more user interface fields in addition to interface fields that existed in the interface prior to the inclusion of the one or more interface fields independently of a change in source code; and a storer for storing the values in a management information base in accordance with the mapping between the user interface fields and the management information base fields.

5. An apparatus of claim 4 further comprising:

a network device value sender coupled to the user interface field value receiver and configured to send the values to a network device to be managed based on the values; and a management information base value storer coupled to the user interface field value receiver and to the network device value sender and configured to store the values in a management information base in accordance with the mapping between user interface fields and management information base fields.

6. An apparatus of claim 5, wherein the network device value sender includes a management information base sender configured to send the management information base to the network device.

7. An apparatus comprising:
  means for accessing a description file stored in a memory that includes information, corresponding to one or more user interface fields, wherein the description file includes information, written in a markup language, on how to display a user interface;
  means for generating a user interface based on the description file, wherein the user interface includes the one or more user interface fields that are mapped to a management information base (MIB) name in the description file that is mapped to an object identifier for identifying a value corresponding to a user interface field, and wherein the description file includes a mapping between the user interface fields and management information base fields; and
  means for receiving values for the one or more user interface fields wherein a modification of the user interface is effected to include the one or more user interface fields in addition to interface fields that existed in the interface prior to the inclusion of the one or more interface fields independently of a change in source code; and
  storing the values in a management information base in accordance with the mapping between the user interface fields and the management information base fields.

8. The apparatus of claim 7, wherein the descriptive language is Extensible Markup Language (XML).

9. The apparatus of claim 7, further comprising a means for sending the management information base to a network device to be managed based on the values in the management information base.

10. A program storage device readable by machine, tangibly embodying a program of instructions executable by the machine to perform a method, the method comprising:
  accessing a description file stored in a memory that includes information corresponding to one or more user interface fields wherein the description file includes information, written in a markup language, display a user interface;
  generating a user interface based on the description file, wherein the user interface includes the one or more user interface fields that are mapped to a management information base (MIB) name in the description file that is mapped to an object identifier for identifying a value corresponding to a user interface field, wherein the description file includes a mapping between the user interface fields and management information base fields;
  displaying the user interface;
  receiving values for the one or more user interface fields wherein a modification of the user interface is effected to include the one or more user interface fields in addition to interface fields that existed in the interface prior to the inclusion of the one or more interface fields independently of a change in source code;
  storing the values in a management information base in accordance with the mapping between the user interface fields and the management information base fields; and
  sending the values to the network device.

11. The program storage device of claim 10, wherein the descriptive language is Extensible Markup Language (XML).

12. The program storage device of claim 11, the method further comprising sending the management information base to a network device to be managed based on the values in the management information base.

13. The method of claim 1, further comprising sending a management information base using a transport protocol, the transport protocol comprising one of secure shell (ssh), telnet, and simple network management protocol (SNMP).

14. The apparatus of claim 4 wherein the network device value sender further comprises a network device value sender coupled to the user interface field value receiver and configured to send the management information base to a network device to be managed based on the values in the management information base, the network device value sender further configured to send the management information base using a transport protocol, the transport protocol comprising one of secure shell (ssh), telnet, and simple network management protocol (SNMP).

15. The apparatus of claim 7 wherein the means for sending further comprises means for sending the values using a transport protocol, the transport protocol comprising one of secure shell (ssh), telnet, and simple network management protocol (SNMP).

16. The program storage device of claim 10, the method further comprising sending a management information base using a transport protocol, the transport protocol comprising one of secure shell (ssh), telnet, and simple network management protocol (SNMP).

17. The method of claim 1 wherein the one or more fields comprises two or more fields.

18. The apparatus of claim 4 wherein the one or more fields comprises two or more fields.

19. The apparatus of claim 7 wherein the one or more fields comprises two or more fields.

20. The program storage device of claim 10 wherein the one or more fields comprises two or more fields.

21. The method of claim 1, further comprising, after generating, displaying the user interface to the user.

22. The method of claim 1, further comprising, after the receiving, sending the values to a network device to be managed based on the values in the management information base.

23. The apparatus of claim 4, further comprising a user interface displayer coupled to the user interface generator and configured to display the user interface to the user.

24. The apparatus of claim 4, further comprising a network device value sender coupled to the user interface field value receiver and configured to send the values to a network device to be managed based on the values in the management information base.

25. The apparatus of claim 7, further comprising means for, after generating, displaying the user interface to the user.

26. The apparatus of claim 7, further comprising means for, after receiving, sending the values to the network device.

27. The program storage device of claim 10, the method further comprising, after generating, displaying the user interface to the user.

28. The program storage device of claim 10, the method further comprising, after the receiving, sending the values to a network device to be managed based on the values in a management information base.

* * * * *